N. ERSNES.
BREAD CUTTER.
APPLICATION FILED DEC. 12, 1914.
1,221,300.
Patented Apr. 3, 1917.
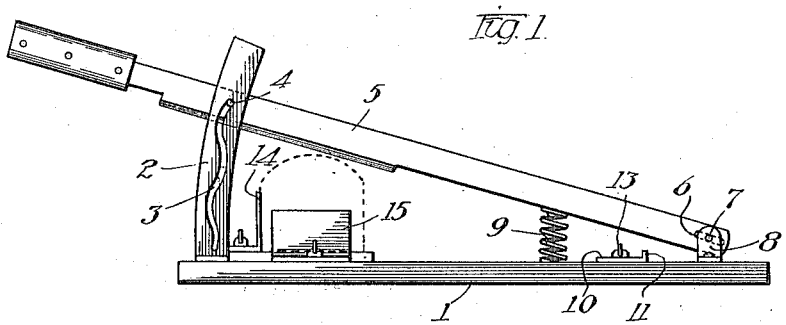
Fig. 1.
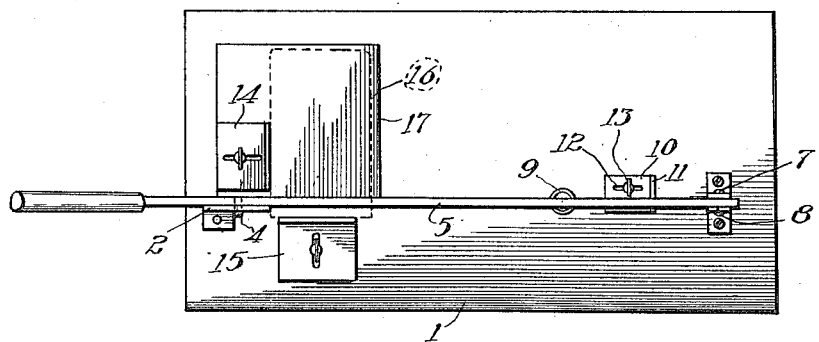
Fig. 2.
Fig. 3.
Witnesses:
Arthur W. Carlson
Robert H. Weir
Inventor
N. Ersnes
By N. J. Sanders
Atty.

UNITED STATES PATENT OFFICE.

NILS ERSNES, OF ANTELOPE, MONTANA.

BREAD-CUTTER.

1,221,300.   Specification of Letters Patent.   Patented Apr. 3, 1917.

Application filed December 12, 1914. Serial No. 876,926.

*To all whom it may concern:*

Be it known that I, NILS ERSNES, a citizen of the United States, residing at Antelope, in the county of Sheridan and State of Montana, have invented certain new and useful Improvements in Bread-Cutters, of which the following is a specification.

This invention relates to improvements in bread cutters and its object is to produce a simple, practical and efficient device of this kind for slicing bread, cheese and the like. Means are provided whereby a slice may be wholly or partly cut from the loaf.

With the foregoing and other objects in view the invention consists in the combination and arrangement of parts to be hereinafter fully described in the following specification, pointed out in the claim and illustrated in the accompanying drawing which forms a part of said specification and in which—

Figure 1 is a side elevation of my improved bread cutter.

Fig. 2 is a plan view of the same.

Fig. 3 is an end view.

Like reference characters indicate corresponding parts throughout the several views.

The reference numeral 1 designates the base of the device upon which a curved standard 2 is erected that is formed with a zigzag slot 3 and in said slotted portion a guide pin 4 carried by knife 5 is disposed; said knife being formed at one end with an elongated slot 6 through which a pin 7 extends that is carried in castings 8, 8 secured to the base. Manual movement of the knife toward the base 1 will move the pin 4 through the slot 3 thus imparting a longitudinal reciprocating movement to said knife which will add to its efficiency in operation. A spring 9 carried by the base 1 engages the knife to return it to normal position after it has been pressed toward the base 1.

Beneath the knife upon base 1 a plate 10 is slidably disposed and formed with an upturned edge 11, said plate being formed with a longitudinal slot 12 through which a set screw 13 extends that slidably secures it to said base, the purpose of said plate being to limit the approach of the knife toward the base 1 upon its down stroke. Near the standard 2 adjustable guides 14, 15 are secured to serve as stops for the loaf 16 which is placed upon the receiving board 17 which also carries the guide 14, the guide 15 being secured to the base 1 in advance of the receiving board.

Operation: The loaf is placed upon the receiving board partly beneath the knife. The knife is moved toward the base 1 thus causing it to slice the loaf. After each stroke of the knife the loaf is advanced a distance equal to the thickness of one slice. If it is desired to cut the slice off the loaf the plate 10 is moved toward the receiving board thereby permitting the knife to make the maximum stroke. If it is only desired to cut the loaf into clinging slices the plate 10 is moved away from the receiving board thus limiting the stroke of the knife.

What is claimed is:

A bread cutter comprising a base, a reciprocating knife mounted on said base, and a plate slidably and adjustably secured to said base beneath said knife, said plate being formed with one upturned edge whereby the length of stroke of said knife may be varied.

In testimony that I claim the foregoing as my own I have hereto affixed my signature in the presence of two subscribing witnesses.

NILS ERSNES.

Witnesses:
 O. P. WALLER,
 OSCAR SUNDAHL.

Copies of this patent may be obtained for five cents each, by addressing the "Commissioner of Patents. Washington, D. C."